(12) United States Patent
Block et al.

(10) Patent No.: US 7,900,202 B2
(45) Date of Patent: Mar. 1, 2011

(54) IDENTIFICATION OF SOFTWARE EXECUTION DATA

(75) Inventors: Matthew A. Block, Redmond, WA (US); Calin Negreanu, Portland, OR (US); Ovidiu G. Temereanca, Bellevue, WA (US); Nathan Cornillon, Olivette, MO (US)

(73) Assignee: Microsoft Corporation, Redmond, WA (US)

( * ) Notice: Subject to any disclaimer, the term of this patent is extended or adjusted under 35 U.S.C. 154(b) by 1285 days.

(21) Appl. No.: 11/263,470

(22) Filed: Oct. 31, 2005

(65) Prior Publication Data

US 2007/0169111 A1    Jul. 19, 2007

(51) Int. Cl.
   *G06F 9/445* (2006.01)
(52) U.S. Cl. ......... 717/175; 717/168; 717/169; 717/170; 717/171; 717/174; 717/176; 717/177
(58) Field of Classification Search .......................... None
   See application file for complete search history.

(56) References Cited

U.S. PATENT DOCUMENTS

| | | | |
|---|---|---|---|
| 5,274,813 | A | 12/1993 | Itoh |
| 6,145,066 | A | 11/2000 | Atkin |
| 6,182,212 | B1 | 1/2001 | Atkins et al. |
| 6,370,646 | B1 * | 4/2002 | Goodman et al. ............ 713/100 |
| 6,434,744 | B1 | 8/2002 | Chamberlain et al. |
| 6,625,622 | B1 | 9/2003 | Henrickson et al. |
| 6,889,376 | B1 | 5/2005 | Barritz et al. |
| 7,356,679 | B1 | 4/2008 | Le et al. |
| 7,503,042 | B2 * | 3/2009 | Henrickson et al. ......... 717/175 |
| 2002/0010808 | A1 | 1/2002 | Wiggins et al. |
| 2002/0144248 | A1 | 10/2002 | Forbes et al. |
| 2002/0178233 | A1 | 11/2002 | Mastrianni et al. |
| 2003/0056102 | A1 | 3/2003 | Aho et al. |
| 2003/0110481 | A1 | 6/2003 | Wada et al. |
| 2003/0172373 | A1 | 9/2003 | Henrickson et al. |
| 2003/0212990 | A1 * | 11/2003 | Brodkorb et al. ............. 717/174 |
| 2003/0234808 | A1 | 12/2003 | Huang et al. |
| 2004/0128203 | A1 | 7/2004 | Pierre et al. |
| 2005/0055194 | A1 | 3/2005 | Krause et al. |

OTHER PUBLICATIONS

Unknown, "PCMover Move All Your Programs, Files and Settings to a New PC," revised in Apr. 2005, 10 pages, http://www.laplink.com/products/pcmover/overview.asp, Laplink Software, Inc., USA.

Unknown, "StepUpPro—PC Migration Tool", 2004, 10 pages, http://www.cellarstone.com/stepuppro.htm, CellarStone, Inc., USA.

Unknown, "Personality Transport Pro", printed on Aug. 24, 2005, 3 pages, http://www.tranxition.com/ptpro.html, Tanxition Corporation, USA.

Unknown, "IntelliMover", version 3.73, 2005, 2 pages, http://www.detto.com/intellimover, Detto Technologies, USA.

(Continued)

*Primary Examiner* — Jason Mitchell
*Assistant Examiner* — Mark A Gooray
(74) *Attorney, Agent, or Firm* — Senniger Powers LLP (57) ABSTRACT

Identification of software program data and configuration data. A set of installation data is identified from an installation log. A set of deduced data is determined based on the identified set of installation data, using various algorithms and heuristics. A set of program data is organized as a function of the starting and deduced data, said program data constituting all data belonging to the software. The software is applied from the source computing device to a destination computing device as a function of the organized set of program data such that the application process mimics the actions of the software's installer so that the software functions seamlessly on the destination computing device.

19 Claims, 10 Drawing Sheets

OTHER PUBLICATIONS

Unknown, "Windows User State Migration Tool (USMT) version 2.6", Oct. 13, 2004, 2 pages, http://www.microsoft.com/downloads/details.aspx?familyid=4AF2D2C9-F16C-4C52-A203-8DAF944DD555&displaylang=en, Microsoft Corporation, USA.

Unknown, "Spearit Announces Beta Release of Associate This", Apr. 2, 2003, 1 page, http://www/spearit.com/press release_2003_-4-2.html, Spearit, USA.

Price, Kyle, "Alohabob PC Relocator Ultra Control, 2004", Feb. 2004, 2 pages, http://www.alohabob.com/about_us/press_room/news_coverage.asp?type=news&id=53, Bits & Bytes Magazine, USA.

Rich, David, "Our Review of PC Relocator Ultra Control", Technology TNT, Mar. 26, 2004, 2 pages, http://www.alohabob.com/about_us/press_room/news_coverage.asp?type=news&id=52, Technology TNT, USA.

Munro, Jay, "Alohabob PC Relocator Ultra Control", Jun. 8, 2004, 5 pages, http://www.pcmag.com/article2/0,1759,1593237,00.asp, Ziff Davis Publishing Holdings, Inc., USA.

Unknown, "Unicenter Desktop DNA r11", 2005, 5 pages, http://www3.ca.com/Files/DataSheets/unicenter_desktop_dna_r11_ds.pdf, Computer Associates International, Inc., USA.

Unknown, "Unicenter Desktop DNA", printed on Aug. 26, 2005, 3 pages, http://www3.ca.com/Solutions/Overview.asp?ID=4920&TYPE=S, Computer Associate International, Inc., USA.

Unknown, "Move Me FAQ (Frequently Asked Questions)", printed on Aug. 26, 2005, 6 pages, http://www.spearit.com/FAQ_MoveMe.html, Spearit Software, USA.

Grolaux et al., "Migratable User Interfaces: beyond migratory interfaces," Aug. 2004, 9 pages.

Smith, Jonathan M., "A Survey of process Migration Mechanisms," vol. 22, Issue 3, 13 pages.

* cited by examiner

FIG. 6

IDENTIFICATION OF SOFTWARE EXECUTION DATA

BACKGROUND

Computing devices, such as a computer, usually include software to provide a variety of functions to a user. For example, the computing device may include software such as an operating system or application programs that assist users in composing or editing an electronic document, importing digital photos or audio recordings from an external device (e.g., an MP3 player), browsing media content on a network (e.g., the Internet), and/or playing games.

With new or more advanced technologies becoming available everyday, the user may wish to replace an old computing device with a new computing device. While the new computing device may already include software, the user frequently wishes to move the software in the existing computing device to the new computing device without the hassle of installing programs on the new computing device. For example, suppose the user wishes to move video game programs from the existing computing device to the new computing device. While a clean or new installation of the video game program on the new computing device still enables the user to operate the video games on the new computing device, some configurable data (e.g., highest scorer or longest football game passing yards) in the existing computing device is not included in the clean or new installation of the games on the new computing device. This deficiency frustrates the user and further adversely affects the user experience on the new computing device.

Also, many people find it hard to replace an old computing device with a new one, because they may have misplaced installation CDs for their software programs, or have deleted the original install packages for downloaded programs. Many programs keep their binary data and settings spread throughout the system across various data stores (i.e. memory areas), which makes it very impractical for a user to attempt to transfer programs manually. For example, some large application programs install over 30,000 unique registry entries as part of the program. Trying to locate and move these entries manually is almost impossible.

Current migration systems enable the user to migrate settings or files from one computing device to another computing device, using static knowledge built into the migration system. Before migrating a program's settings, these migration systems are "hard coded" to identify and migrate a program and/or its settings through experimentation with an existing program. For example, to migrate a particular application's settings, a migration developer first installs it, modifies its settings, and uses a special tool to understand what effect the settings modification had on the system. This knowledge is then converted into a "script" or "hard coded" knowledge, which the migration system can use to migrate applications and/or their settings when it sees the same exact program on a source computer.

Another approach when moving programs and settings is to attempt to move "everything at once", and hope it works on the destination system. The problem with this approach is that because it is not a componentized approach, it will often fail if there are any existing applications on the destination machine. For example, if one were to try and move all programs from the source machine, and apply it to a machine which already had a new version of some of the programs, this approach would produce a disastrous result, because it would overwrite newer versions of files with older ones.

Other systems performing migration of application programs require installing a monitoring or tracking program to monitor or track any application program installed after the monitoring program is installed. If any existing application programs were installed before the monitoring program is installed, these systems would not be able to allow users to perform an effective migration of these existing application programs.

SUMMARY

Embodiments of the invention dynamically identify data on a system which constitute one particular program. This typically occurs by using something reliable, such as a program's "install log" (which many programs keep on the system to aid with uninstall) as a starting point for fully describing the program. Then, using various algorithms and heuristics, each of which is generally targeted to a specific data store or area of the system, and this starting data is "enhanced" by making deductions on the starting data. Finally, in rare cases, where the deduced data does not adequately describe the program, it is further enhanced with expert knowledge to supplement the deduced data.

In one aspect of the invention, the identified data for a particular program may be applied to a new computing device, which, in effect, copies the program from the old computing device to the new one. Alternatively, special rules for applying the data may come into effect, such as renaming data before applying it, or not applying the program data at all due to a conflict on the destination system.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Appendix A illustrates exemplary operations for performing one or more operations of various embodiments of the invention.

Corresponding reference characters indicate corresponding parts throughout the drawings.

DETAILED DESCRIPTION

Figure 1A:
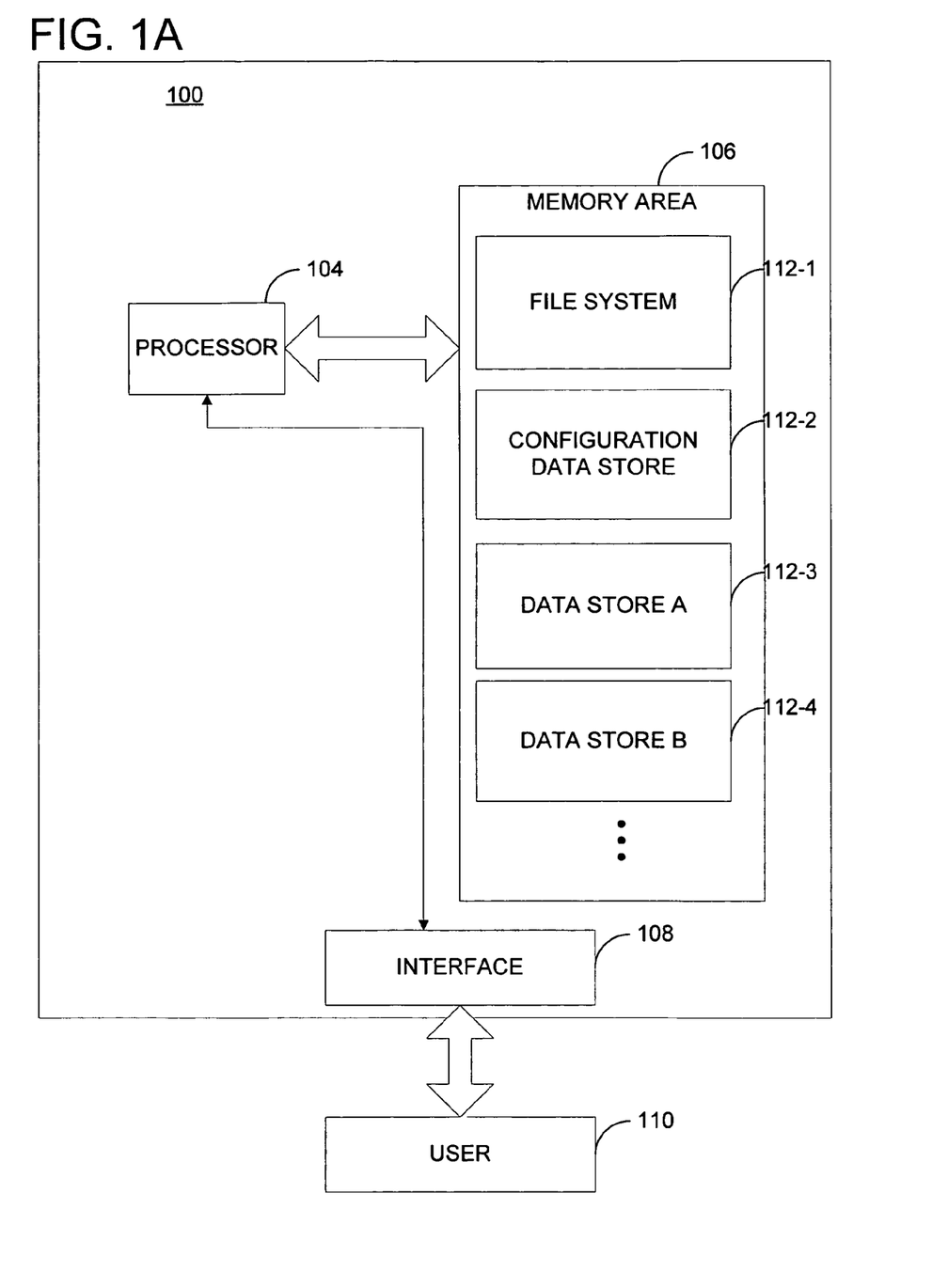
FIG. 1A is a block diagram illustrating an exemplary computing system including data stores according to an embodiment of the invention.

Referring first to FIG. 1A, a block diagram illustrates a computing system 100 including data stores according to an embodiment of the invention. The system 100 includes a processor 104 which manages a memory area 106 and an interface 108 for use by a user 110 to control the processor 104 or system 100. For example, system 100 may be a computer (e.g., computer 130 in FIG. 7), a computing device, a collection of two or more computers or computing devices connected by a common communication network, such as an internet or intranet. The software 102 may be an application program or suite of application programs. The processor 104 may be one processing unit or multiple processing units for executing executable instructions, codes, or routines. The interface 108 includes a user interface (UI), a display, and/or a communication interface.

Figure 7:
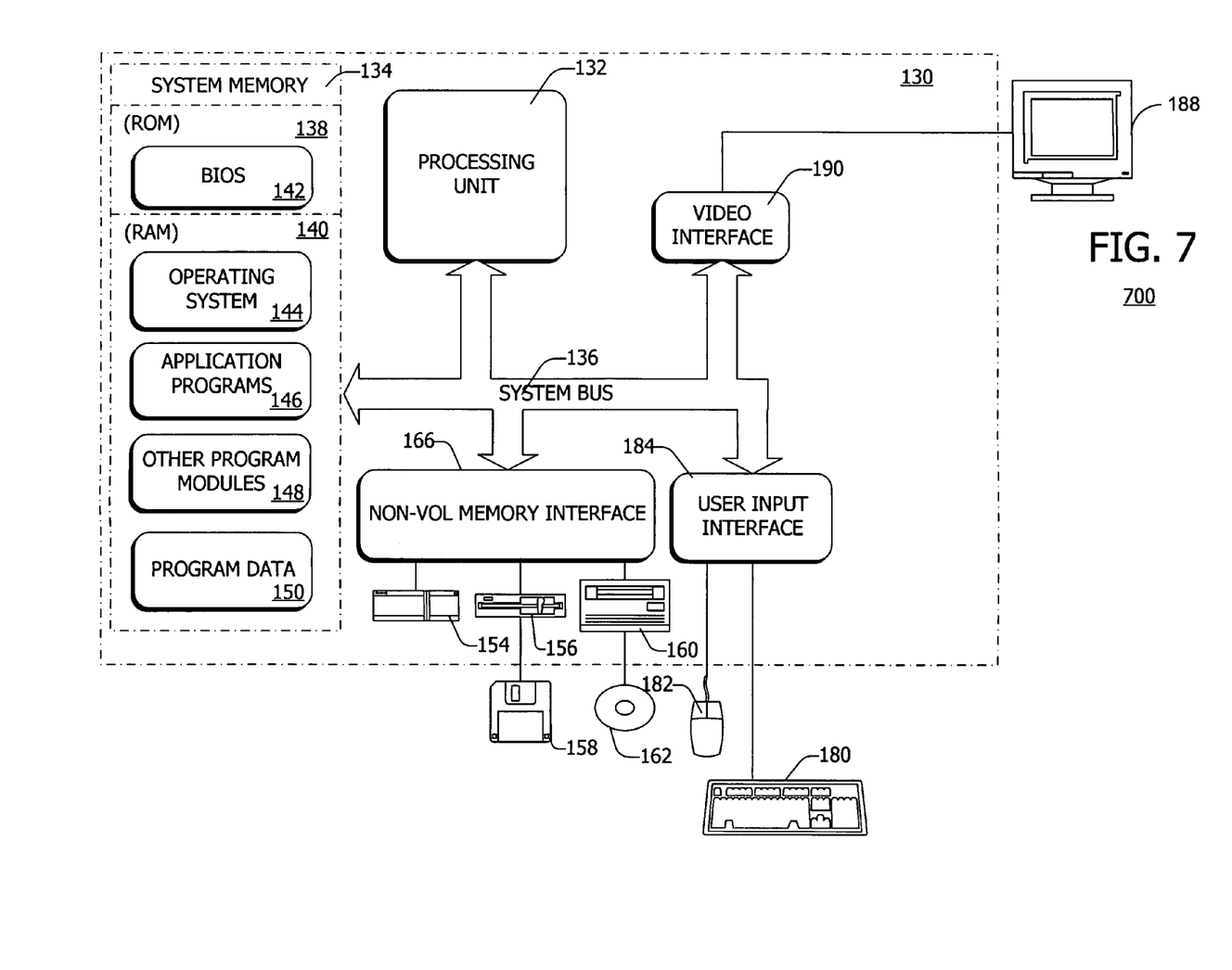
FIG. 7 is a block diagram illustrating one example of a suitable computing system environment in which embodiments of the invention may be implemented.

The memory area 106 may be a tangible computer-readable medium, such as, system memory 134 in FIG. 7, or both volatile and non-volatile storage media. The memory area 106 stores data which may be in a file system 112-1, a configuration data store 112-2, a data store A 112-3, and a data store B 112-4. While the file system 112-1, the configuration data store 112-2, the data store A 112-3, and a data store B 112-4 are shown in distinct blocks, it is to be understood that data associated with an operating system, software, an application or the like in the file system 112-1, the configuration data store 112-2, the data store A 112-3, and a data store B 112-4 may be scattered in the memory area 106 or may be stored in clusters in the memory area 106.

Figure 1B:
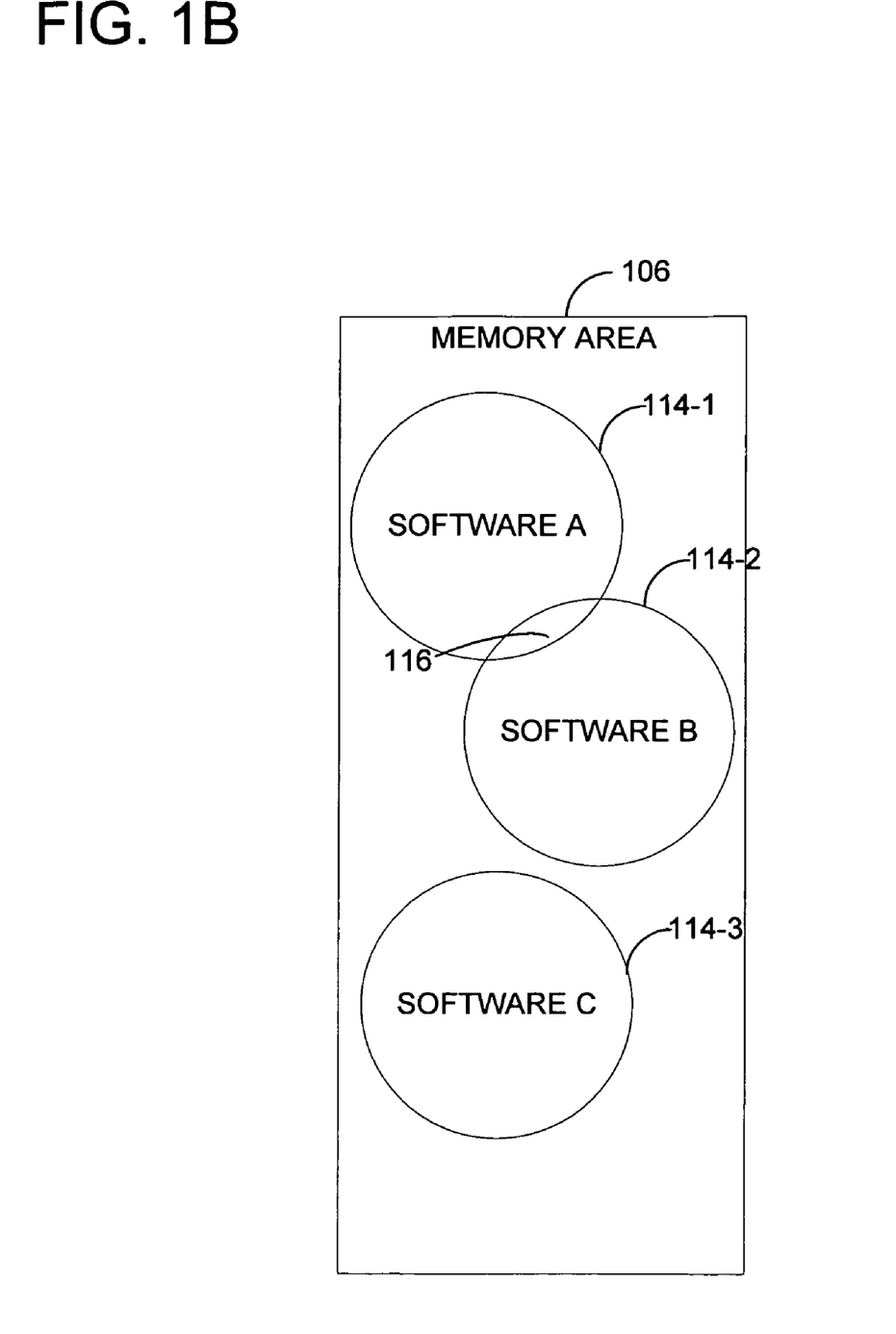
FIG. 1B is a block diagram illustrating another view of the memory area of a computing device according to an embodiment of the invention.

For example, FIG. 1B illustrates a block diagram showing the memory area 106 includes data for software A 114-1, software B 114-2, and software C 114-3. While each software program (i.e., software A 114-1, software B 114-2, or software C 114-3) is distinct from one another (as shown by the circles surrounding each software), one or more pieces of data may be shared by software programs, as shown by the area indicated 116. In another example, data associated with software C 114-3 is not associated or share with software A 114-1 or software B 114-2.

Figure 1C:
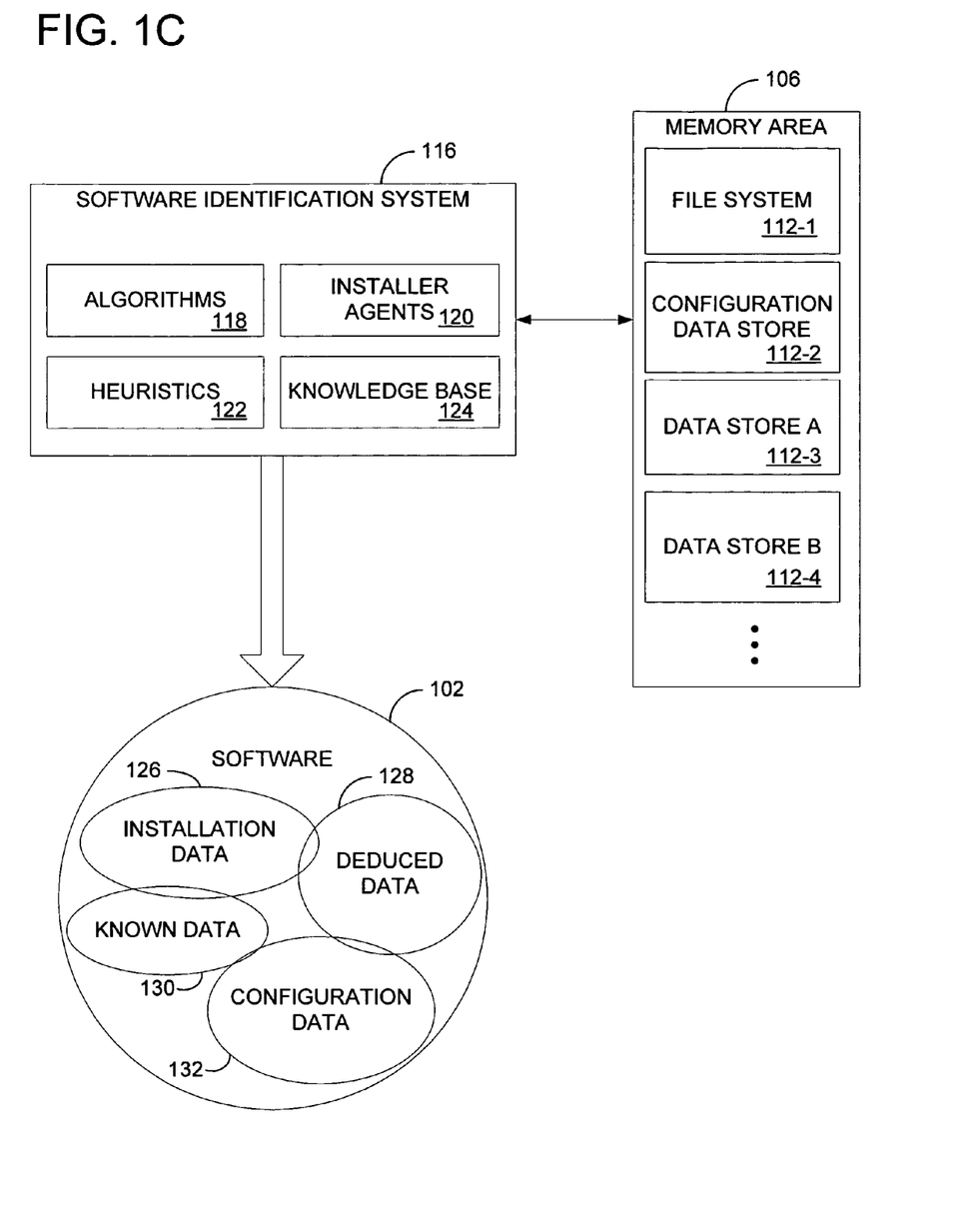
FIG. 1C is a block diagram illustrating a software identification system for scanning the memory area of a computing device as illustrated in FIG. 1A according to an embodiment of the invention.

FIG. 1C is a block diagram illustrating a software identification system 116 for scanning the memory area 106 of the system 100, as illustrated in FIG. 1A, to identify software 102 according to an embodiment of the invention. Initially, before software 102 may be suitable for operation on system 100, an installation program or installation routines are executed. For example, the installation program may be an InstallShield® application, a Microsoft® Installer (MSI) installer, a Wise® installer, a MindVision® VISE® installer, a Nullsoft® scriptable install system, a Blizzard installer, or other proprietary installation program. The installation program is responsible for unpacking a set of data such that, after unpacking, software 102 is installed and available for operation by a user 110.

After installation, data associated with software 102 may be scattered in memory area 106. As illustrated, data associated with software 102, like other types of data, may stored in the file system 112-1, the configuration data store 112-2, the data store A 112-3, or the data store B 112-4 of the memory area 106. In another example, some data associated with software 102 may be organized for the user 110 in a structured manner, such as in a directory or a folder, while other data (e.g., those related to execution of software 102) may be scattered widely in multiple locations. In addition, other configuration data associated with software 102 may be organized in a separate data store or memory area such that the configuration data is accessed only during runtime or initialization of software and is not retrievable after execution.

As such, the software identification system 116 identifies data associated with software 102 from the memory area 106 such that the user 110 may perform operations on the data representing software 102. For example, the user 110 may wish to migrate software 102 from system 100 to another system. In particular, user 110 may copy software 102 from system 100 and then integrate software 102 to another system. In one example, software 102 includes program data, such as a set of installation data 126, a set of deduced data 128, a set of known data 130, a set of configuration data 132, or other data.

In one embodiment, software identification system 116 includes a collection of algorithms 118, installer agents 120, a collection of heuristics 122, and a knowledge base 124, which will be discussed in detail in FIGS. 3A, 3B, 4, and 5.

Figure 2:
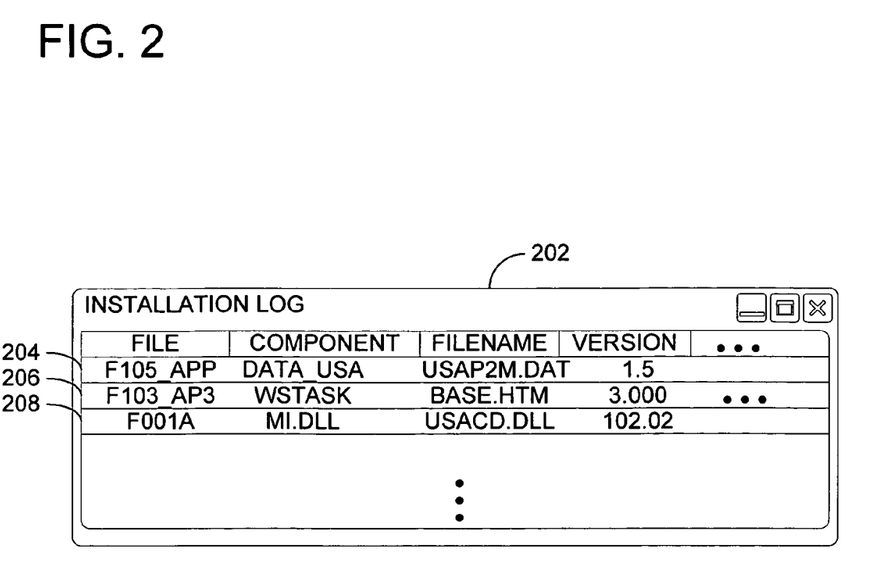
FIG. 2 is a block diagram illustrating exemplary contents of an installation log according to an embodiment of the invention.

Referring next to FIG. 2, a diagram illustrates exemplary contents of an installation log 202 according to an embodiment of the invention. For example, some of the installation programs generate an installation log which may be stored in memory area 106 after installation. The format of the installation log may also be specific to one type of the installation program. The installation log includes a set of installation data for installing software 102. In one embodiment, the installation log may store uninstallation data for uninstalling software 102.

The installation log 202 may include a number of entries for installing software 102. For example, the installation log 202 includes an entry 204 which indicates a file "F105_APP" is to be installed for a component "DATA_USA" and the file would have a file name "USAP2M.DAT" with a version of "1.5." Similarly, an entry 206 indicates that a file "F103_AP3" is to be installed for a component "WSTASK" with a file name "BASE.HTM" having "3.000" version. Additionally, an entry 208 indicates that a file "F001A" is to be installed for a component "MI.DLL" with a file name "USACD.DLL" and a version of "102.02." In one embodiment, installation log 202 includes other formats of organizing installation data included therein based on the types of installation programs.

Embodiments of the invention identify a set of installation data 126 sources (such as the installation log, an uninstallation log, or a main location where the software is stored) without requiring the user to select the locations where data associated with software 102 might be located. For example, processor 104 executes a set of instructions (e.g., software identification system 116) for identifying the set of installation data 126, and such identification may involve parsing, scanning, and/or searching through the installation log. In an alternative embodiment, processor 104 executes one or more components or agents (e.g., a set of computer-executable instructions or routines), and each of the one or more components or agents identifies programs installed by one type of installation program. For example, a component may be responsible for all InstallShield® installed programs while another component or agent may be responsible for Wise® installed programs. In yet another embodiment, processor 104 may execute one component or agent that may identify the set of installation data 126 regardless of the type of installation programs.

After the set of installation data is identified, a set of deduced data 128 based on the identified set of installation data 126 is deduced by the one or more algorithms or heuristics (e.g., algorithms 118, heuristics 122). For example, deduced data 128 includes data enhanced or deduced from the installation data 126, such as shortcuts, configuration data settings, Component Object Model (COM) registration, fonts, operating system services registrations, and/or start-up settings. Other deduced data such as user defined settings, user documents, or the like may be included in the deduced data 128.

For each type of deduced data (i.e., shortcuts, or the like), embodiments of the invention provide a particular set of computer-executable instructions for deducing that type of deduced data. For example, shortcuts may be organized in one location, such as the desktop or "Main Menu" of a computing device. These shortcuts link to various files on the computing device, so that user 110 can double-click to immediately access programs (e.g., software 102 in FIG. 1C) or other files in the main memory area. Given that it is known which binary files belong to each application (i.e. from the install log or starting basis—126), one can deduce that a shortcut belongs to a particular application when the shortcut's target file belongs to the particular application or software. For example, suppose software 102 is "My App." If a shortcut called "Start Menu\Programs\My App\My App.lnk" exists, and provides a link to a target binary file "c:\program files\my app\app.exe", and it is to be known that "c:\program files\my app\app.exe" belongs to "my app" from its installation log, it can be deduced that the shortcut "Start Menu\Programs\My App\My App.lnk" also belongs to "My App", since it points to a file belonging to "My App". Appendix A includes exemplary instructions illustrating an example of the collection of algorithms 118 and the collection of heuristics 122 for identifying deduced data 128 of or deducing the installation data 126 of each of the types of deduced data.

In yet another example, in identifying the Common Object Model (e.g., COM) registration data which belongs to a particular application or software, embodiments of the invention deduce all the object configuration entries which belong to software 102. In another example of identifying operating system services registration data, information associated with operating system services that may be implemented by software 102 is identified by deduction. Also, deduced data relating to start-up settings, which include values in the configuration for running the software 102 at initialization of an operating system, are deduced. In one example, each specialized area of the system (such as shortcuts, system services, COM registration, user settings, etc. . . . ) may have a dedicated algorithm or heuristic to determine which pieces of data belong to software. Other examples related to fonts or other deduced data are further described in Appendix A.

Figure 3A:
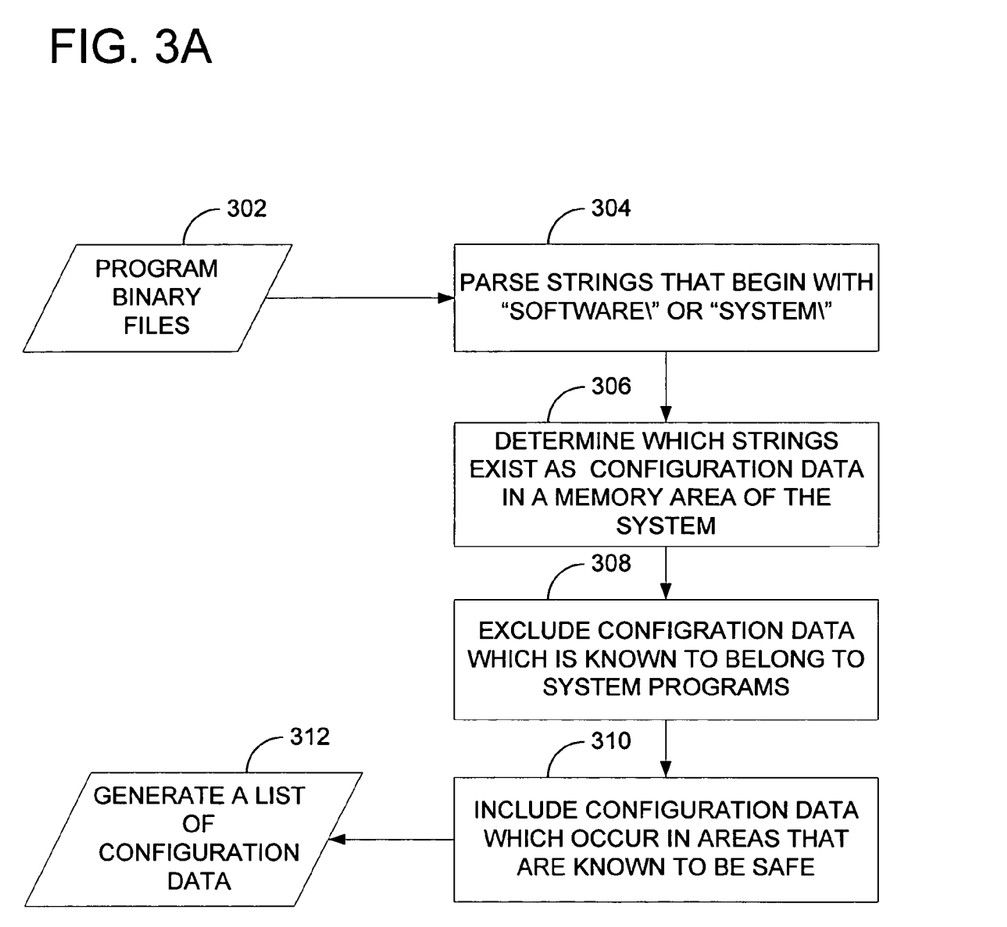
FIG. 3A is a flow chart illustrating a method for identifying program configuration data associated with software according to an embodiment of the invention.
Figure 3B:
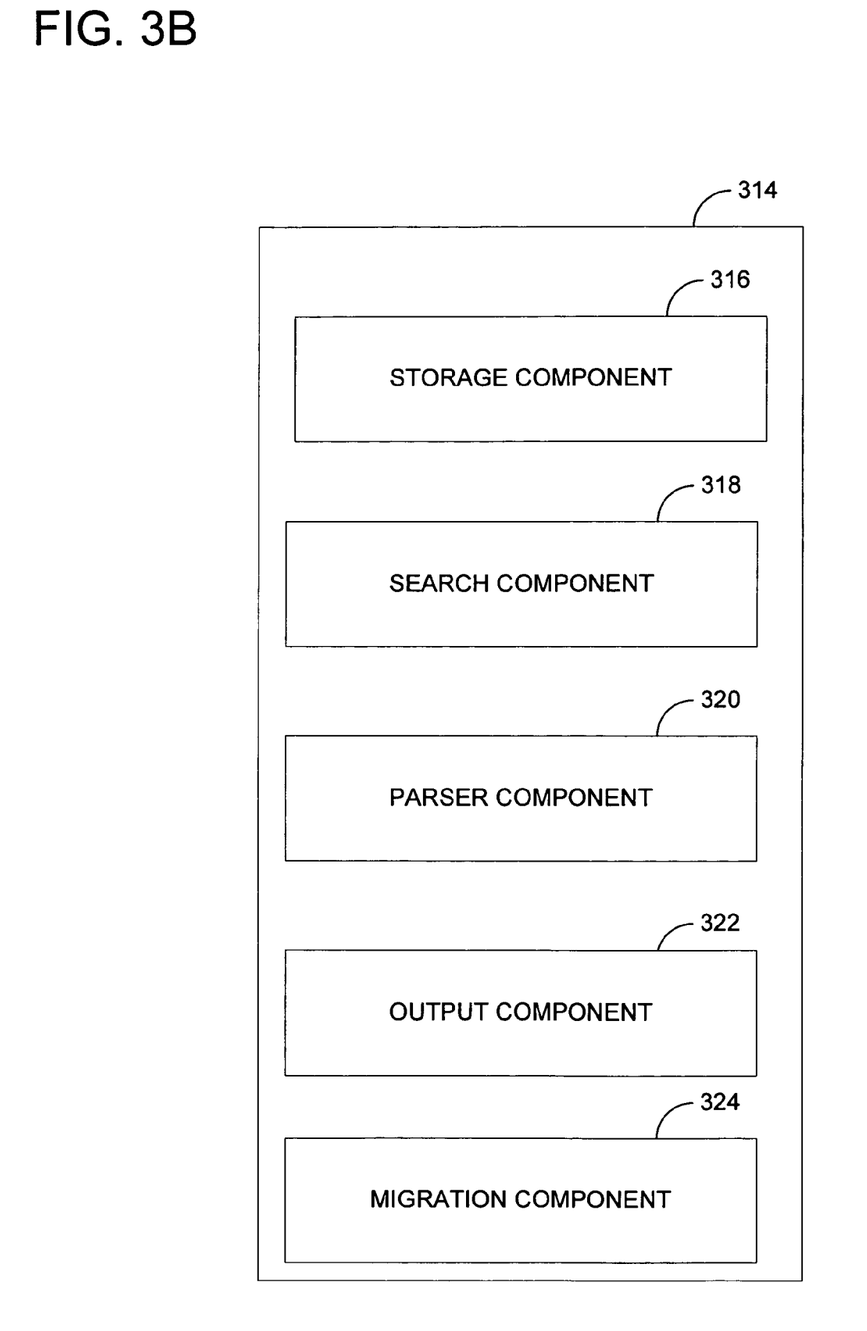
FIG. 3B is a block diagram illustrating a tangible computer-readable medium having computer-executable components for executing the method illustrated in FIG. 3A according to an embodiment of the invention.

Referring now to FIGS. 3A-3B, a flow chart and a block diagram illustrate a method for deducing configuration data according to an embodiment of the invention. As described above, deduced data includes, among other data or parameters, configuration data. In deducing such data, binary files in memory area 106 are identified at 302. For example, the program binary files may be stored by a storage component 316 of a tangible computer-readable medium 314, and a search component 318 identifies the program binary files that are associated with software 102. In one embodiment, the program binary files include executable files, executable library files, and executable object files. In another embodiment, the program binary files may be identified by scanning or parsing the content of the installation log or a file.

Once the program binary files are identified, at 304, strings are extracted or parsed according to a rule from each of the identified binary files. For example, a parser component 320 of the tangible computer-readable medium 314 may parse or extract strings from the identified binary files. The rule defines requirements associated with the configuration data. For example, the rule may define requirements such as a sequence (e.g., begins with "software" or "system") of the strings, a string length, or a terminating character (e.g., a NULL character). In one example, the strings are parameters of a function call from the software to open or create a configuration data identifier. These strings were typically inserted into a binary file by an application's compiler, in response to the function call.

At 306, it is determined whether the configuration data referred to by the extracted or parsed string exists as configuration data in memory area 106. In one example, an output component 322 of tangible computer-readable medium 314 is configured to perform the determination operation. A list is generated to include each of the strings that refers to configuration data in the data store or memory area. For example, some of the extracted or parsed strings may refer to configuration data stored in memory area 106 while other strings may refer to configuration data that is no longer present in the present in memory area 106. By doing so, embodiments of the invention validate useful and actual configuration data by identifying the configuration data that actually exists in memory area 106. In one embodiment, the configuration data is checked against both a data store storing deduced data associated with a user operating the software (e.g., HKEY_CURRENT_USER) and in another data store storing deduced data associated with the computing device where the software is installed (e.g., HKEY_LOCAL_MACHINE).

In another embodiment, at 308, a subset of configuration data is excluded from a list of strings if the subset of configuration data (e.g., known data 130) is known to belong to other system programs or software (e.g., software 102), or other software in the computing device (e.g., system 100). For example, suppose software A and software B both access configuration data X (i.e., sharing information in the configuration data X). From previously identifying configuration data associated with software A (i.e. creating the list of known data 130), it is known that configuration data X belongs to software A (such as a system program) and not software B (a user installed program). As such, if the list is used to migrate software B from computing device 1 to computing device 2 by a migration component 324, the configuration data X would not be included in the list because configuration data X belongs to software A even though both software A and B references, accesses, or shares configuration data X.

At 310, the configuration data known to be safe is included in the list of configuration data. At 312, the list of the configuration data is generated, composed, or outputted for further processing, such as the migration component 324. In one embodiment, the list includes at least the names of the configuration data and the configuration data itself.

In yet another embodiment, a system or tangible computer-readable medium includes one or more computer-executable components for executing instructions or routines described in FIG. 3A.

In one embodiment, after these components or agents collect the set of deduced data based on the identified set of installation data, the knowledge base 124 may provide patching data or additional information to the collected set of deduced data 128. For example, while the set of installation data and the set of deduced data include most of the data associated with software 102, some software includes obscure or particular data that is unique to the software. Such obscure or particular sets of data may include a certain miscellaneous configuration data identifier (e.g., registry key), for example, and the configuration data identifier is not defined anywhere in the installation log, or related to any deduced data. Embodiments of the invention can manually modify or supplement this miscellaneous configuration data identifier by creating a patch in knowledge base 124 for the software. In one embodiment, knowledge base 124 may include an online knowledge data store, a human input, or expert knowledge. As such, the knowledge base 124 supplements the set of installation data 126 and the set of deduced data 128 to completely identify data associated with software 102.

After the set of deduced data 128 is collected or, in one embodiment, the set of deduced data is patched by information from knowledge base 124, a set of program data is generated. For example, the set of program data represents, defines, or describes all data (both executable and non-executable) required for the execution or operation of software 102. For example, the set of program data includes user data such as the lowest amount of time in completing a 500-mile race in a racing game, a saved document file created with a particular spreadsheet program, or the highest number of three-pointer baskets in a basketball game. In one embodiment, the set of program data includes a list of objects which belongs to or constitutes the software 102. In another example, the set of program data includes a sequence of executing or installing software 102 in a computing device, which is illustrated below:

```
{
    "Copy C:\Program Files\App\MyApp.exe to
    C:\Programs\App\MyApp.exe"
    "Copy all keys and values under HKLM\Software\MyCompany\App"
    "Increment the integer value stored at registry key
    HKLM\Software\X"
    "Create Windows NT service Y, implemented by
    C:\Programs\App\MyService.exe"
}
```

In an alternative embodiment, a pattern representing the program data is constructed. For example, the pattern may include information such as collecting program data in the following locations: "C:\program files\my app\*", or "HKLM\Software\OpenO\10\*". The generated set of program data may be applied to a destination computing device. For example, the generated set of program data is applied, as part of migrating software 102, from a source computing device to a destination computing device. Also, the interface 108 may receive instructions from user 10 for migrating software 102 from one computing device to another computing device using the generated set of program data.

Figure 4:
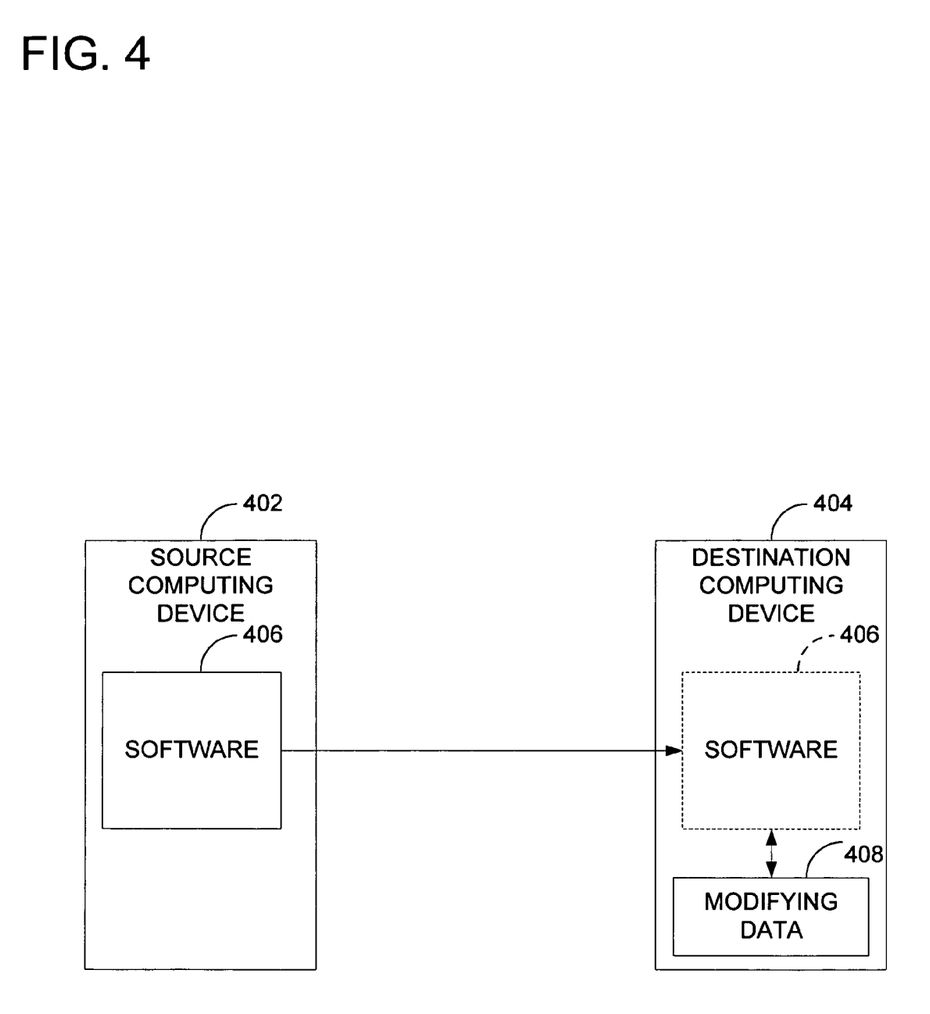
FIG. 4 is a block diagram illustrating an exemplary migration of software from a source computing device to a destination computing device according to an embodiment of the invention

FIG. 4 is a block diagram illustrating an exemplary migration of software 306 from a source computing device 402 to a destination computing device 404 according to an embodiment of the invention. For example, it is known in the art that installed software generally may not simply be copied from one computing device to another computing device and be executed on the another computing device due to the different execution environments of the computing devices. Also, some prior migration systems fail to fully migrate software from a source (e.g., the source computing device 402) to a destination (e.g., the destination computing device 404) because the prior migration systems attempt to copy everything at once and do not use a componentized approach.

Initially, on the destination computing device 404, a list of software that is currently installed in destination computing device 404 is detected. Once it is determined that software 406 is not already installed in destination computing device 404, and no other problematic conditions exist (such as different versions of the same software, incompatible software, or other issues) software 406 is migrated from the source computing device 402 to destination computing device 404.

Figure 6:
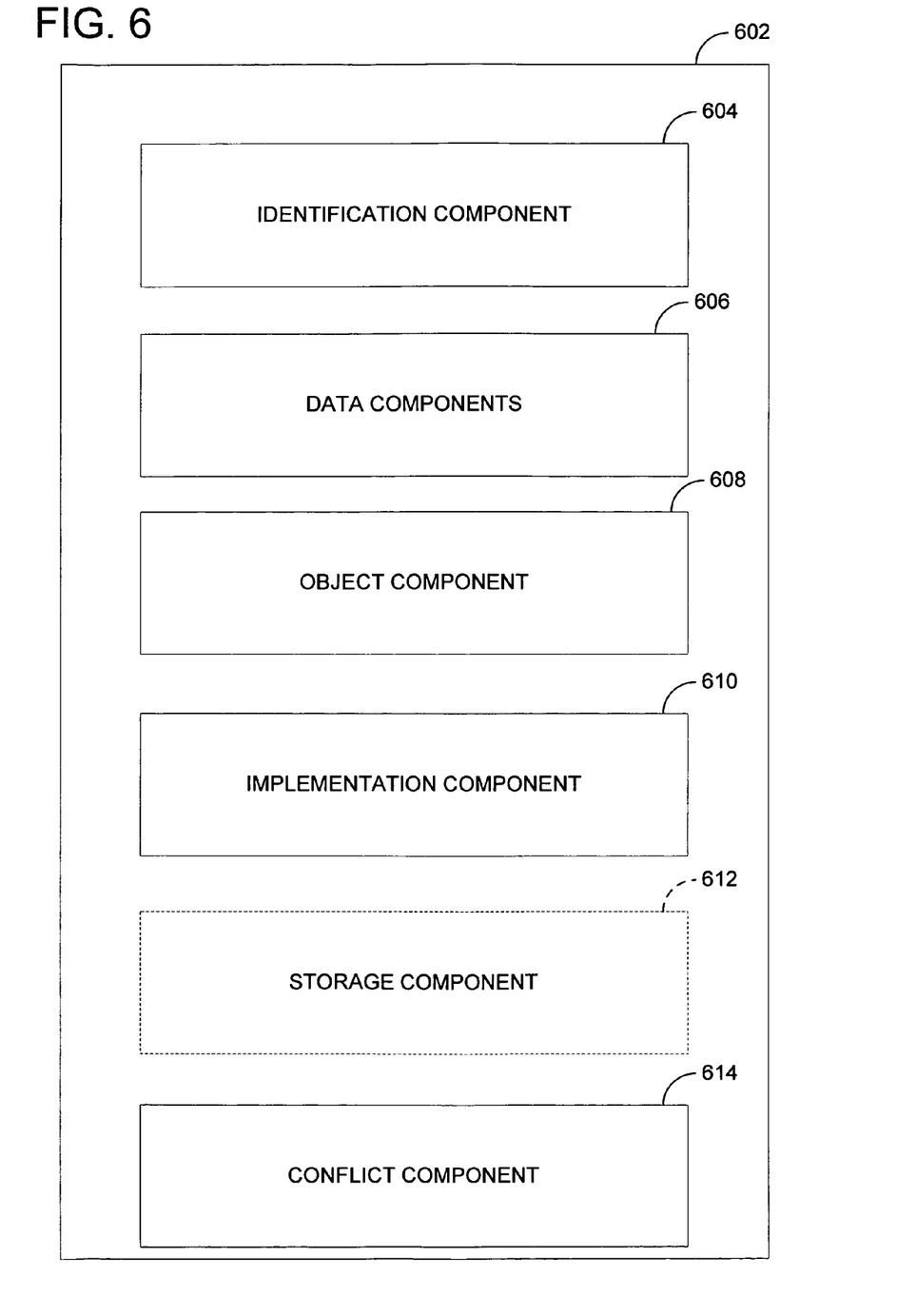
FIG. 6 is a block diagram illustrating an exemplary tangible computer-readable medium on which aspects of the invention may be stored.

In one embodiment, an implementation component 610 (see FIG. 6) applies/migrates software 406, which is represented by program data of software 406. In one embodiment, implementation component 610 is installed in source computing device 402 and not in destination computing device 404. In another embodiment, implementation component 610 detects a lower version or newer version of software 406 before applying software 406. In yet another alternative embodiment, implementation component 610 modifies the software by modifying the set of installation data, the set of deduced data and the set of program data as a function of a set of modifying data 408. In one example, the implementation component 610 applies the software 406 by selectively updating software 406, as needed, after migrating software 406 to destination computing device 404 with updating data coupled to destination computing device 404 via wired or wireless means. Alternatively, these updates simulate what the application's or software's installer would have done had it installed the application or software itself. In yet another alternative embodiment, the updates simply make it possible to run the software such as to resolve file version conflicts. Alternatively, backing up the software on the source computing device, uninstalling the software from the source computing device, and/or providing information relating to the software may be part of an embodiment of the invention.

Figure 5:
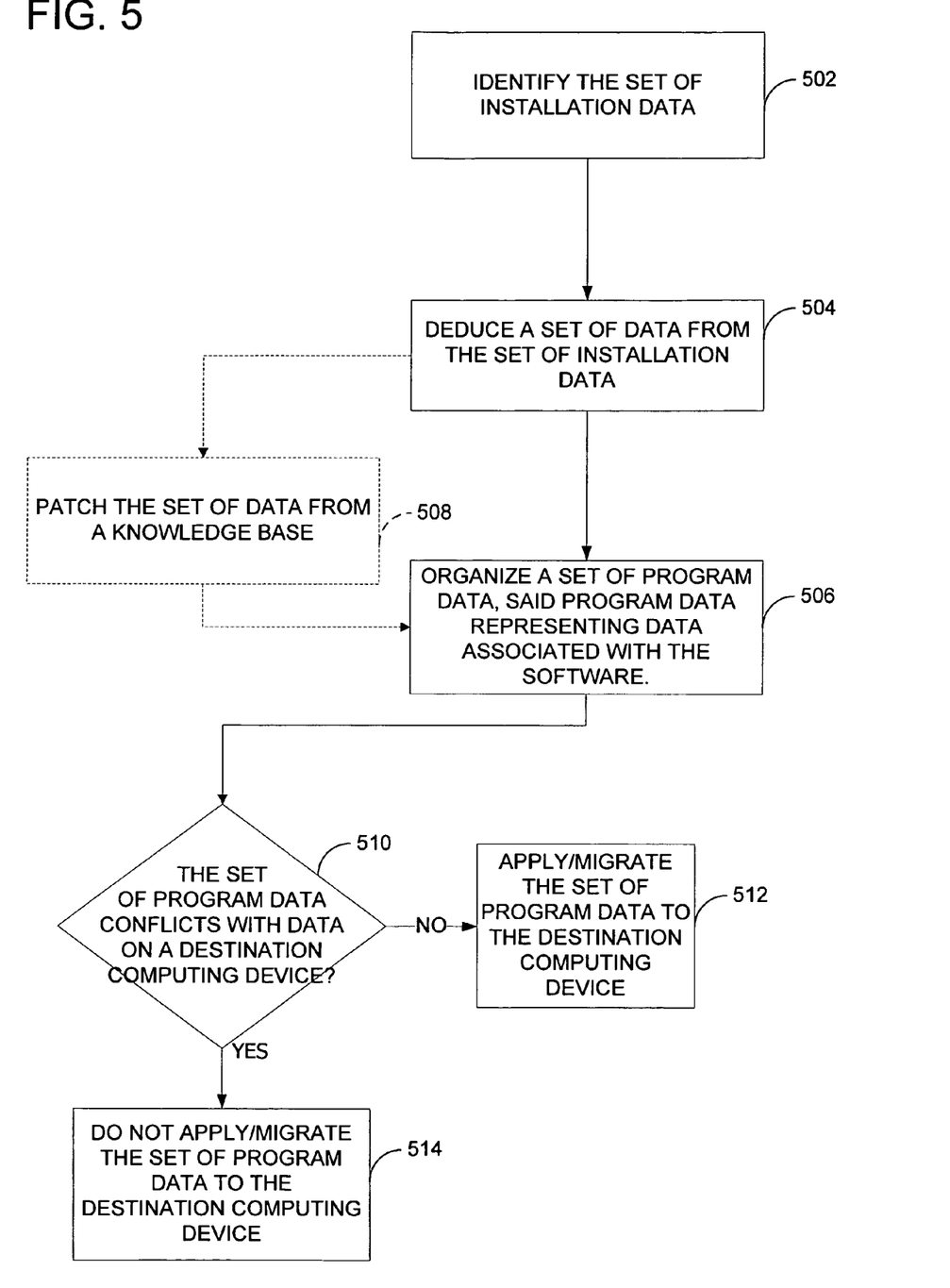
FIG. 5 is a flow chart illustrating a method for identifying program data associated with software according to an embodiment of the invention.

FIG. 5 is a flow diagram illustrating a method of identifying data associated with software. At 502, an identification component 604 in FIG. 6 identifies a set of installation data from an installation log. At 504, one or more data components 606 collect a set of deduced data based on the identified set of installation data. In one example, the deduced data defines data relating to the software. An object component 608 generates or organizes a set of program data as a function of the collected set of deduced data at 506. The set of program data represents operations performed for the operation of the software. At 508, alternatively, the set of deduced data is patched by a knowledge base for supplementing the collected set of deduced data. The set of program data is employed as a function of the organized set of program data. For example, at 510, a conflict component 614 determines whether the set of program data creates a conflict with data on a destination computing device when the set of program data is applied to the destination computing device. If the determination is negative, an implementation component 610 applies the software as a function of the generated set of program data at 512. In another alternative embodiment, the software is migrated by the implementation component 610 from a source computing device to the destination computing device and storing the set of installation data, the set of deduced data and the set of program data in the destination computing device at 512. In yet another alternative embodiment, if the conflict component 614 determines that there is a conflict at 510, the set of program data is not applied or migrated to the destination computing device at 514. In such an embodiment, the user 110 may be notified if the set of program data is not applied or migrated to the destination computing device.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

The following illustrates exemplary operations in deducing the installation data:

Section I: Shortcuts

```
{       For a set of files X,
            scan all well established locations for storing shortcuts
            (start menu, desktop,
        quicklaunch),
            and
            return the set of all .lnk files which point to files in X.
}
```

Section II: Configuration Data Settings:

```
{       For a set of executable files Y,
            scan each such binary file for strings beginning with
            "Software\" or
            "System\", and ending in NULL;
            {       For each strings having ANSI and UNICODE
            strings;
                    set the returned results = set S.
            }
{       For each string in set S,
            identify if the string exists as a configuration data
            identifier, either in
            "HKEY_LOCAL_MACHINE" or
            "HKEY_CURRENT_USER".
        If strings in set S exists as a configuration data identifier,
        then
            check it against a filter of allowable areas of the
            configuration data (i.e. non
        system areas).
            If strings occur in an allowable area of the
            configuration data (e.g., according
        to manually developed filters),
```

-continued
```
        then
            identify the configuration data identifier S as a
            setting for the
            application or software (for migration).
}
```

Section III: Object (e.g., COM) Registration

```
{       Given a set of program data (files, registry entries, etc...)
        Z belonging to software:
        For all entries in HKEY_CLASSES_ROOT,
        collect: all CLSID keys which have implementing files in Z;
            all TypeLib keys which have implementing files in Z;
            all Interface keys which have implementing CLSID keys in Z;
            all Interface keys which have implementing TypeLib keys in Z;
            all AppID GUID keys which have implementing CLSID keys in Z;
            all AppID keys which have implementing AppID GUID keys in Z;
            all FileType keys which have implementing CLSID keys in Z;
            all ProgID keys which have implementing CLSID keys in Z;
            all ProgID Default Icon entries which have implementing files
            in Z;
            all Shell commands (and also parent ProgIDs) which have
            implementing files in Z;
            all ShellEx entries which have implementing CLSID keys in Z;
            all Extension keys which have implementing ProgIDs in Z;
            all Extension"Open With"keys(e.g.
"HKEY_CLASSES_ROOT\.zip\OpenWithProgids\<progid>") which
have implementing
ProgID keys in Z;
            all Extension ShellEx keys
(e.g. "HKEY_CLASSES_ROOT\.zip\ShellEx\<guid>") which
have implementing CLSID
keys in Z;
            all Mime Content Types which have implementing Extension keys
            in Z.
        If the COM registration entry is deemed to belong to the
        system (e.g. a CLSID which
    is implemented by a known system file or system registry entry),
        then
            remove the entry from the set of deduced data.
}
```

Section IV: Font Registration

```
{
        Given a set of files X,
        collect all entries in HKLM\SOFTWARE\CurrentVersion\Fonts,
        which point to files in X.
}
```

Section V: Operating System Services

```
{       Given a set of files X,
        For each service in the Service Control Manager (SCM),
        collect deduced data associated with each service that has
        implementing files in the
    set X;
        collect deduced data in which each service is implemented by a
        dynamic link library
    (DLL);
        collect deduced data in which each service is hosted in another
        process (e.g.,
    svchost.exe).
}
        In the alternative embodiment where migration is used:
        { For collected deduced data related to services described above,
            migrate the collected deduced data using the SCM API.
        }
```

Section VI: Environment Variables

```
{   Given a set of binary files X belonging to an application
    or software:
    For all entries in
    HKLM\SYSTEM\CurrentControlSet\Control\Session
Manager\Environment and HKEY_CURRENT_USER\Environment;
    collect entries that have values which contain paths in
    the set X.
    For "%PATH% environment variables, collect entries whose
    semicolon separated
values contain paths in the set X.
}
```

Section VII: Start-Up Settings

```
{   Given a set of binary files X belonging to an application or
    software:
    collect all entries in HKLM\SOFTWARE\CurrentVersion\Run
    and HKCU\SOFTWARE\CurrentVersion\Run which point to files in
    the set X.
}
```

Section VIII: Shared DLLs

```
{   Given a set of binary files X belonging to software:
    For all entries in
    HKLM\SOFTWARE\System\CurrentVersion\SharedDlls, which
point to files in the set X,
    collect the set of deduced data by placing a new entry with
    reference count 1 on the
destination computing device (if it doesn't already exist on the
target machine),
    or simply incrementing the reference count on the target
    computing device if the
value already exists.
}
```

What is claimed is:

1. A method implemented at least in part by a computing device for identifying software, installed on a memory area accessible by the computing device, said software having configuration data stored on the memory area, said method comprising:
   identifying a set of installation data associated with the software independent of a user selecting a location of the set of installation data, said set of installation data being identified from an installation log or an uninstallation log created when the software was installed on the memory area;
   deduce from said instillation data deduced data;
      said deduced data comprises two or more data types comprising of: shortcuts, configuration data setting, component operation model (COM) registration, and start-up settings;
   deducing a set of one or more types of deduced data, said deducing comprising:
   identifying type-specific data from each type of deduced data;
   applying type-specific rules to extract text stings from the identified type-specific data of each type of the deduced data;
      comparing data referenced by the extracted text strings with the stored configuration data of the software to determine whether the extracted text strings exists on the memory area;
   organizing a set of program data as a function of the determining, said program data constituting data belonging to the software; and
   generating a list based on the organized set of program data; and
   employing the software as a function of the generated list.

2. The method of claim 1, wherein employing the software comprises one or more of the following: migrating the software from a source computing device to a destination computing device by storing the set of program data in the destination computing device, backing up the software on the source computing device, uninstalling the software from the source computing device, or providing information relating to the software.

3. The method of claim 2, wherein migrating further comprising determining if a conflict exists before applying the software to the destination computing device, said conflict being related to at least one of the following: the presence of a different version of the software or the presence of incompatible software, and further comprising selectively updating the software by modifying the program data as needed on the destination computing device and simulating operations performed by an installer for installing the software.

4. The method of claim 1, wherein the set of deduced data comprises data associated with one or more of the following: shortcuts, configuration data settings, component operation model (COM) registration, fonts, operating system services, and start-up settings.

5. The method of claim 1, wherein organizing comprises patching the set of installation data and the set deduced data from a knowledge base.

6. The method of claim 1, wherein one or more tangible computer-readable media have computer-executable instructions for performing the method of claim 1.

7. A system for identifying data associated with software, said system comprising:
   a memory area for storing the software and configuration data associated therewith;
   a processor for executing computer-executable instructions for:
   identifying a set of installation data associated with the software from an installation log or an uninstallation log created when the software was installed on the memory area;
   deduce from said instillation data deduced data;
      said deduced data comprises two or more data types comprising of: shortcuts, configuration data setting, component operation model (COM) registration, and start-up settings;
   deducing a set of one or more types of deduced data, said deducing comprising:
   identifying type-specific data from each type of deduced data;
   applying type-specific rules to extract text strings from the identified type-specific data of each type of deduced data; and
   comparing data reference by the extracted text strings with the stored configuration data of the software to determine whether the extracted text strings exist on the memory area;
   organizing a set of program data as a function of the determining said program data defining data associated with the software; and
   an interface for receiving information for further processing of the software as a function of the organized set of program data.

8. The system of claim 7, wherein the interface receives information for performing one or more of the following to further process the software: migrating the software from memory area to another tangible computer-readable medium by storing the set of program data in another tangible computer-readable medium, and selectively updating the software by modifying the program data as needed on the destination computing device, backing up the software on the source computing device, uninstalling the software from the source computing device, and providing information relating to the software.

9. The system of claim 8, wherein the processor is further configured for determining if a conflict exists before applying the software to the destination computing device, said conflict being related to at least one of the following: the presence of a different version of the software or the presence of incompatible software, and further comprising selectively updating the software by modifying the program data as needed on the destination computing device and simulating operations performed by an installer for installing the software.

10. The system of claim 7, wherein the memory area or an external memory storage medium stores the organized set of program data, or wherein the set of deduced data comprises data associated with one or more of the following: shortcuts, configuration data settings, component operation model (COM) registration, fonts, operating system services, and start-up settings.

11. The system of claim 7, wherein the processor is further configured for patching the set of installation data and the deduced data from a knowledge base, and wherein the memory area stores the knowledge base, and wherein the processor is configured to receive updates to the knowledge base.

12. One or more tangible computer-readable media having computer-executable components for identifying data associated with software installed on a memory area accessible by the computing device, said software having configuration data stored on the memory area, said computer-executable components comprising:
an identification component for identifying a set of installation data from an installation log or an uninstallation log created when the software was installed on the memory are;
deduce from said instillation data deduced data;
said deduced data comprises two or more data types comprising of: shortcuts, configuration data setting, component operation model (COM) registration, and start-up settings;
one or more data components for deducing a set of one or more types of deduced data, said one or more data components deducing the set of the data comprising: identifying type-specific data from each type of the deduced data; applying type-specific rules to extract text strings from the identified type-specific data of the each type of the deducted data; and comparing data referenced by the extracted text stings with the stored configuration data of the software to determine whether the extracted text strings exist on the memory area;
an object component for organizing a set of program data as a function of the determining by the one or more data components, said program data describing data associated with the software; and
an implementation component for migrating the software from a source computing device to a destination computing device using the organized set of program data.

13. The tangible computer-readable media of claim 12, further comprising a storage component for storing the organized set of program data, the set of installation data, and the set of deduced data.

14. The tangible computer-readable media of claim 12, wherein the implementation component migrates the software from the source computing device to the destination computing device by applying the set of program data to the destination computing device.

15. The tangible computer-readable media of claim 14, wherein the implementation component determines if a conflict exists before applying the software to the destination computing device, said conflict being related to at least one of the following: the presence of a different version of the software or the presence of incompatible software.

16. The tangible computer-readable media of claim 12, wherein the set of deduced data comprises data associated with one or more of the following: shortcuts, configuration data settings, component operation model (COM) registration, fonts, operating system services, and start-up settings.

17. The tangible computer-readable media of claim 12, further comprising a patching component for patching the set of installation data and the set of deduced data from a knowledge base.

18. The method of claim 1, wherein deducing comprises excluding a subset from the extracted text stings of each type of the deducted data if the subset is known to belong to another software.

19. The system of claim 7, wherein the processor is further configured for executing one or more components or agents to identify programs installed by one or particular type of installer program.

* * * * *